No. 733,457. PATENTED JULY 14, 1903.
O. P. BROYLES.
NUT LOCK.
APPLICATION FILED APR. 9, 1903.
NO MODEL.
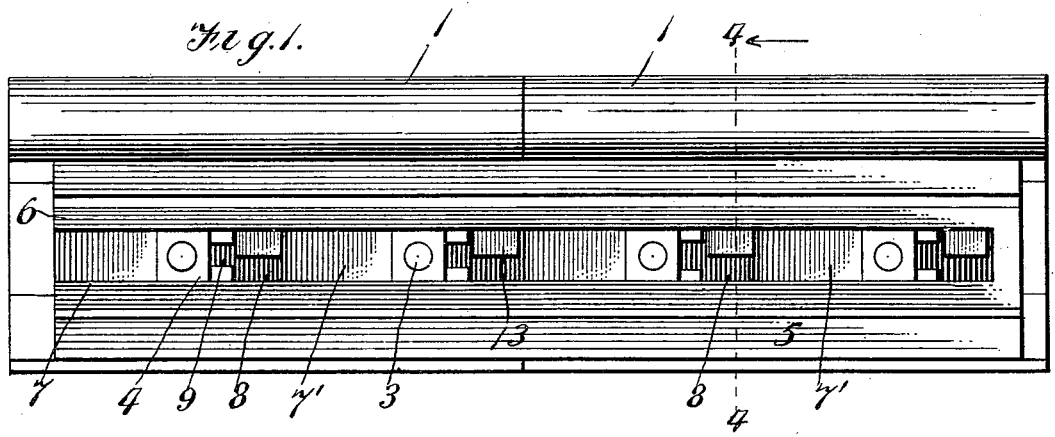
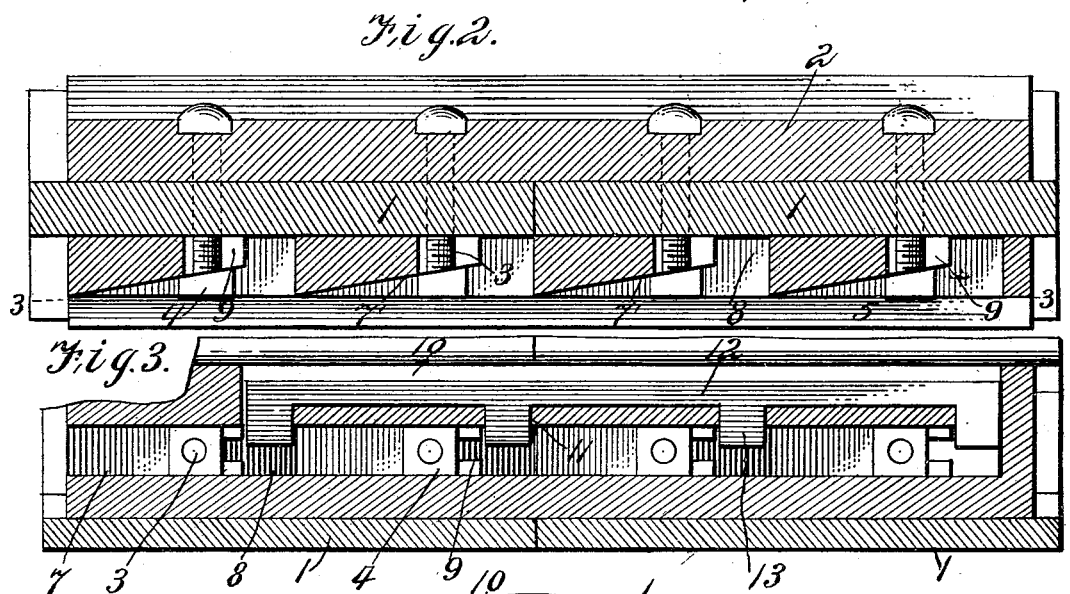
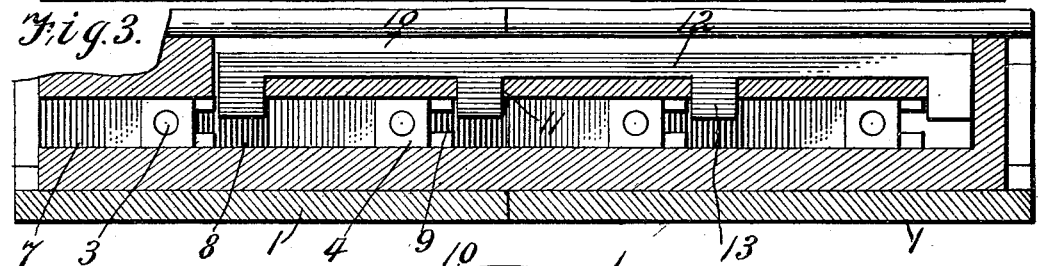
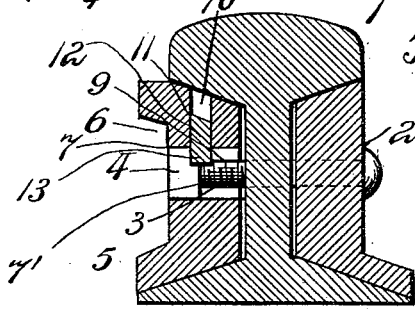
Witnesses
G. V. Worthington
Inventor
Oliver P. Broyles
By H. B. Wilson
Attorney No. 733,457. Patented July 14, 1903.

UNITED STATES PATENT OFFICE.

OLIVER P. BROYLES, OF WESTERN PORT, MARYLAND, ASSIGNOR OF ONE HALF TO MARCUS A. PATRICK AND C. M. LEWIS, OF WESTERN PORT, MARYLAND.

NUT-LOCK.

SPECIFICATION forming part of Letters Patent No. 733,457, dated July 14, 1903.

Application filed April 9, 1903. Serial No. 151,806. (No model.)

*To all whom it may concern:*

Be it known that I, OLIVER P. BROYLES, a citizen of the United States, residing at Western Port, in the county of Allegany and State of Maryland, have invented certain new and useful Improvements in Nut-Locks; and I do declare the following to be a full, clear, and exact description of the invention, such as will enable others skilled in the art to which it appertains to make and use the same.

This invention relates to improvements in nut-locks.

The object of the invention is to provide a nut-lock to be used particularly in connection with rail-joints and in combination with a fish-plate, whereby the latter is constructed to serve the double function of a fish-plate and nut-lock.

A further object is to provide a nut-lock of this character which will be simple, strong and durable, inexpensive, and well adapted to the use for which it is designed.

With these and other objects in view the invention consists of certain novel features of construction, combination, and arrangement of parts, as will be more fully described, and particularly pointed out in the appended claims.

Figure 1 is a side elevation of the meeting ends of two rails, showing the application of the device. Fig. 2 is a horizontal sectional view taken on a line with the bolts. Fig. 3 is a vertical longitudinal sectional view on the line 3 3 of Fig. 2. Fig. 4 is a vertical cross-sectional view on the line 4 4 of Fig. 1 looking in the direction of the arrow.

In the drawings, 1 1 denote the meeting ends of the rails.

2 denotes the ordinary fish-plate, arranged on one side of the rails.

3 denotes the bolts, and 4 the nuts, the rear faces of which are inclined or beveled.

5 denotes the combined nut-lock and fish-plate, arranged on the opposite side of the rails between the heads and the base-flanges thereof, as shown. In the face of the plate 5 is formed a channel 6, which extends throughout the length of the plate. In the rear wall of the channel 6 is formed a channel 7 narrower than the channel 6, the width of the channel 7 being the same as that of nuts 4 and in which the same are adapted to lie.

8 denotes a series of centrally-disposed square openings or holes formed in the plate 5 and passing through the same from the rear of the plate and opening into the channel 7, the size of the openings 8 being the same as the nuts 4 and through which the nuts are adapted to pass in the application of the plate to the rails.

9 denotes a series of slots formed through the plate 5 at one side of the holes 8 and open at one end into said holes, the slots 9 being approximately the width of the bolts. The rear wall of the channel 7 between the holes 8 is beveled to form a series of inclined surfaces 7' between said holes, which are adapted to be engaged by the beveled rear faces of the nuts 4.

In the upper wall of the plate 5 is formed a vertically-disposed longitudinally-arranged cavity or channel extending from the hole 8 at one end of the series to the hole at the opposite end thereof, and at points above the holes 8 are formed vertically-disposed slots 11, which form passages between the channel 9 and the holes 8.

12 denotes a locking-bar which is adapted to lie in the channel 10, and on the bar 12 is formed a series of depending lugs 13, which are adapted to enter and pass through the slots 11, the width of the bar and lugs together being that of the thickness of the plate between the top thereof and the upper wall of the holes 8, so that when the bar 12 is raised to its highest point the lower ends of the lugs 13 are flush with the said upper walls of the holes 8 and do not form any obstruction to the nuts 4 when passing through said holes.

The width of the plate 5 from top to bottom is such that the same will fit snugly between the heads and the base-flanges of the track-rails to which it is applied.

In practice the ends of the rails are brought together, and the fish-plate 2 is arranged in place along one side of the same. The bolts 3 are now passed through the bolt-holes in said fish-plate 2 and the rails 1, and the nuts 4 are screwed upon the ends of the same to their proper positions. The plate 5 is now applied to the opposite side of the rails, the bar 12 and lugs 13 being in their retracted positions. The nuts 4 will freely pass through the holes 8 in said plate and lie in a plane beyond the inner edge of the beveled surfaces 7', and when in this position the plate 5 is driven longitudinally along the rails, tightly wedging the same between the nuts 4 and the web of the rails, the inclined surface of the nuts 4 sliding up the inclined surfaces 7' of the plate and the bolts 3 entering the slots 9 until said nuts clear the edges of the holes 8 and slots 11, at which time the bar 12, carrying the lugs 13, drops by gravity to the bottom of the channel 10, the lugs 13 passing through the slots 11 and dropping behind or beside of the nuts and locking the bar 5 in this position, as shown in Fig. 1. It will thus be seen that as long as the locking-bar and lugs remain down the plate 5 cannot slip back or become loose and that the nuts 4 are securely locked and cannot be unscrewed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. A nut-lock comprising a sliding plate provided with one or more openings for the passage of bolts and nuts one or more inclined surfaces, adapted to be driven into wedged engagement with said nuts, means for preventing the turning of said nuts and means for locking said plate in its wedged engagement therewith, substantially as described.

2. A nut-lock comprising a sliding plate provided with a series of openings for the passage of bolts and nuts, a longitudinally-disposed channel formed in the outer face of said plate, a series of inclined surfaces formed in the rear wall of said channel between said openings and adapted to be driven into wedged engagement with said nuts, and means for locking said plate in such wedged engagement substantially as described.

3. A nut-lock comprising a sliding plate provided with a series of openings for the passage of bolts and nuts, a longitudinally-disposed channel formed in the outer face of said plate, a series of inclined surfaces formed in the rear wall of said channel between said openings and adapted to be driven into wedged engagement with said nuts a vertical longitudinal channel arranged in said plate above said openings and vertical slots communicating between said opening and said channel a longitudinally-disposed bar having depending lugs, said bar and lugs being adapted to have a reciprocating movement in said channel and slots whereby said lugs are permitted to drop behind said nuts to hold said plate in wedged engagement therewith substantially as described.

4. In a nut-lock the combination with a bolt and nut said nut having a beveled or inclined rear face of a plate adapted to have a sliding engagement therewith, an opening formed through said plate for the passage of said nut a slot formed through said plate and communicating with said opening, a channel formed in the face of said plate the upper and lower walls of which are adapted to engage said nut and prevent the same from turning, an inclined surface formed on the rear wall of said channel and adapted to be driven into wedged engagement with the beveled rear face of said nut, and means for holding the plate in said engagement, substantially as described.

In testimony whereof I have hereunto set my hand in presence of two subscribing witnesses.

OLIVER P. BROYLES.

Witnesses:
J. D. THOMAS,
NORRIS BRUCE.